Oct. 19, 1943.  C. N. STONE ET AL  2,332,025
COMBINE
Filed Feb. 3, 1940   3 Sheets-Sheet 1

INVENTORS
CHARLES N. STONE,
JOSEPH L. GREEN &
LOUIS A. PARADISE
BY
ATTORNEYS.

Oct. 19, 1943.  C. N. STONE ET AL  2,332,025
COMBINE
Filed Feb. 3, 1940    3 Sheets-Sheet 2
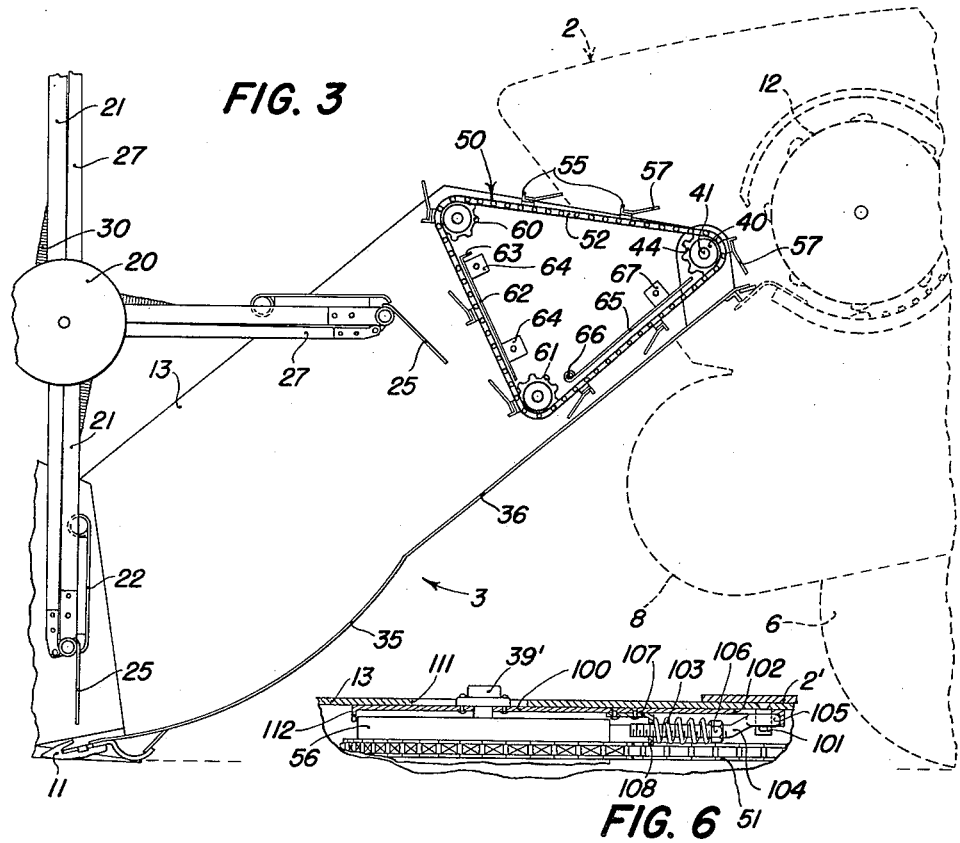
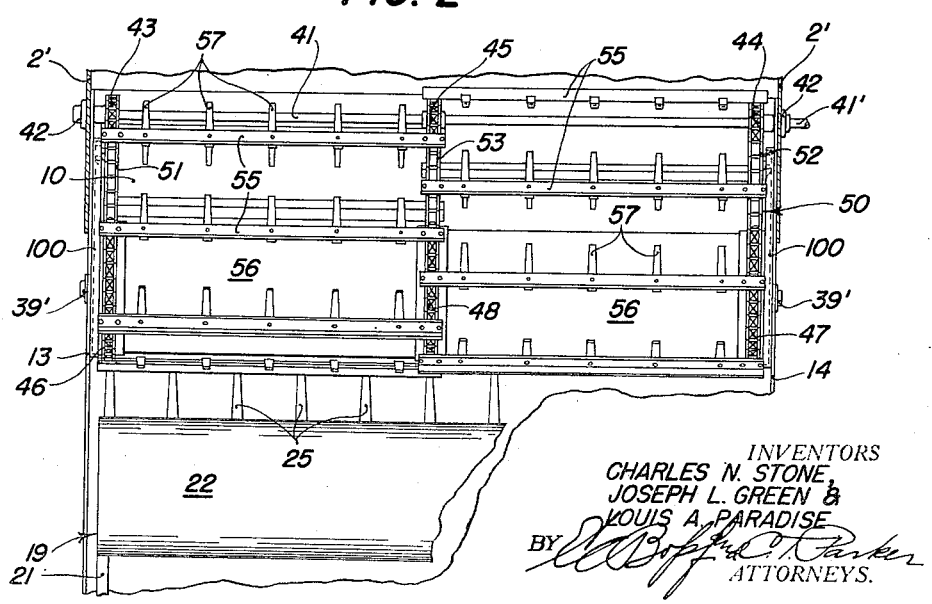
INVENTORS
CHARLES N. STONE,
JOSEPH L. GREEN &
LOUIS A. PARADISE
BY
ATTORNEYS.

Oct. 19, 1943.   C. N. STONE ET AL   2,332,025
COMBINE
Filed Feb. 3, 1940   3 Sheets-Sheet 3
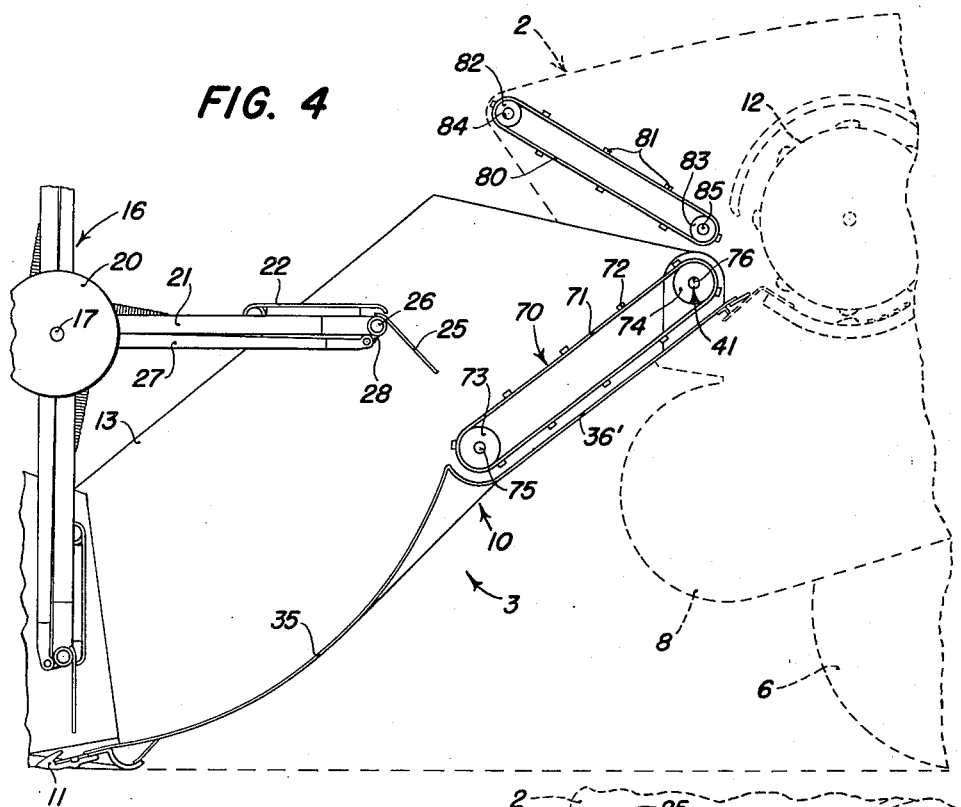
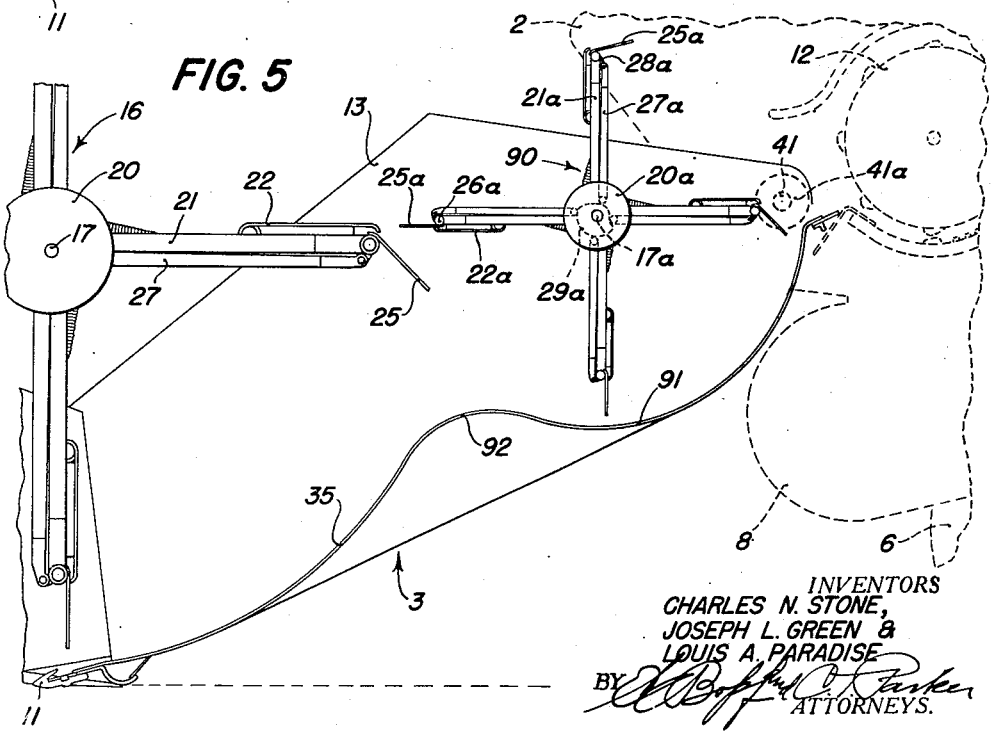
INVENTORS
CHARLES N. STONE,
JOSEPH L. GREEN &
LOUIS A. PARADISE
BY
ATTORNEYS.

Patented Oct. 19, 1943

2,332,025

UNITED STATES PATENT OFFICE 2,332,025

COMBINE

Charles N. Stone, Joseph L. Green, and Louis A. Paradise, Moline, Ill., assignors to Deere & Company, Moline, Ill., a corporation of Illinois Application February 3, 1940, Serial No. 317,212

23 Claims. (Cl. 56—124)

The present invention relates to harvesting machinery and has for its principal object the provision of a new and improved conveying mechanism for moving harvested crops up an inclined grain pan from the cutter bar or pick-up device at the lower end to the threshing cylinder or other crop treating mechanism in the body of the harvester.

In combines of the straight through type having forwardly projecting platforms pivoted to the thresher body about a transverse axis and inclined downwardly therefrom to a cutter bar at the lower end thereof, it has been common practice to provide an endless canvas conveyor movable upwardly through the grain pan from the cutter bar to the threshing cylinder at the upper end thereof. It has usually been found that this canvas conveyor is the first part of the machine to wear out and give trouble and therefore it is a particular object of our invention to provide conveying mechanism in which the use of canvas belts is either minimized or totally eliminated by the use of more durable conveying mechanism.

In the accomplishment of these objects use is made of the harvester reel to move the harvested crops from the cutter bar to an intermediate part in the grain pan, and in order to do this efficiently the grain pan is curved in an arc about the center of rotation of the reel and the latter is provided with crop engaging fingers of the feathering type which serve to sweep the harvested material upwardly through the concave grain pan. The crops are moved from the intermediate point to the upper end of the grain pan by means of several alternative forms of conveying mechanisms which are described herein, reference being had to the drawings appended hereto in which Figure 1 is a side elevation of a harvester platform from which one side of the grain pan is removed to better show the details of the conveying mechanism;

Figure 2 is a partial plan view taken along a line 2—2 in Figure 1 and showing the conveying mechanism in the upper portion of the grain pan and also a portion of the reel;

Figure 3 is a fragmentary side elevation of another embodiment of our invention;

Figure 4 is a partial side elevation of still another embodiment of our invention;

Figure 5 is a partial side elevation of still a further embodiment of our invention; and Figure 6 is a fragmentary plan view taken in section along a line 6—6 in Figure 1 and showing the details of mounting the front roller of the conveyor for vertical swinging movement.

Like reference numerals refer to similar parts throughout the specification and drawings.

Figure 1:
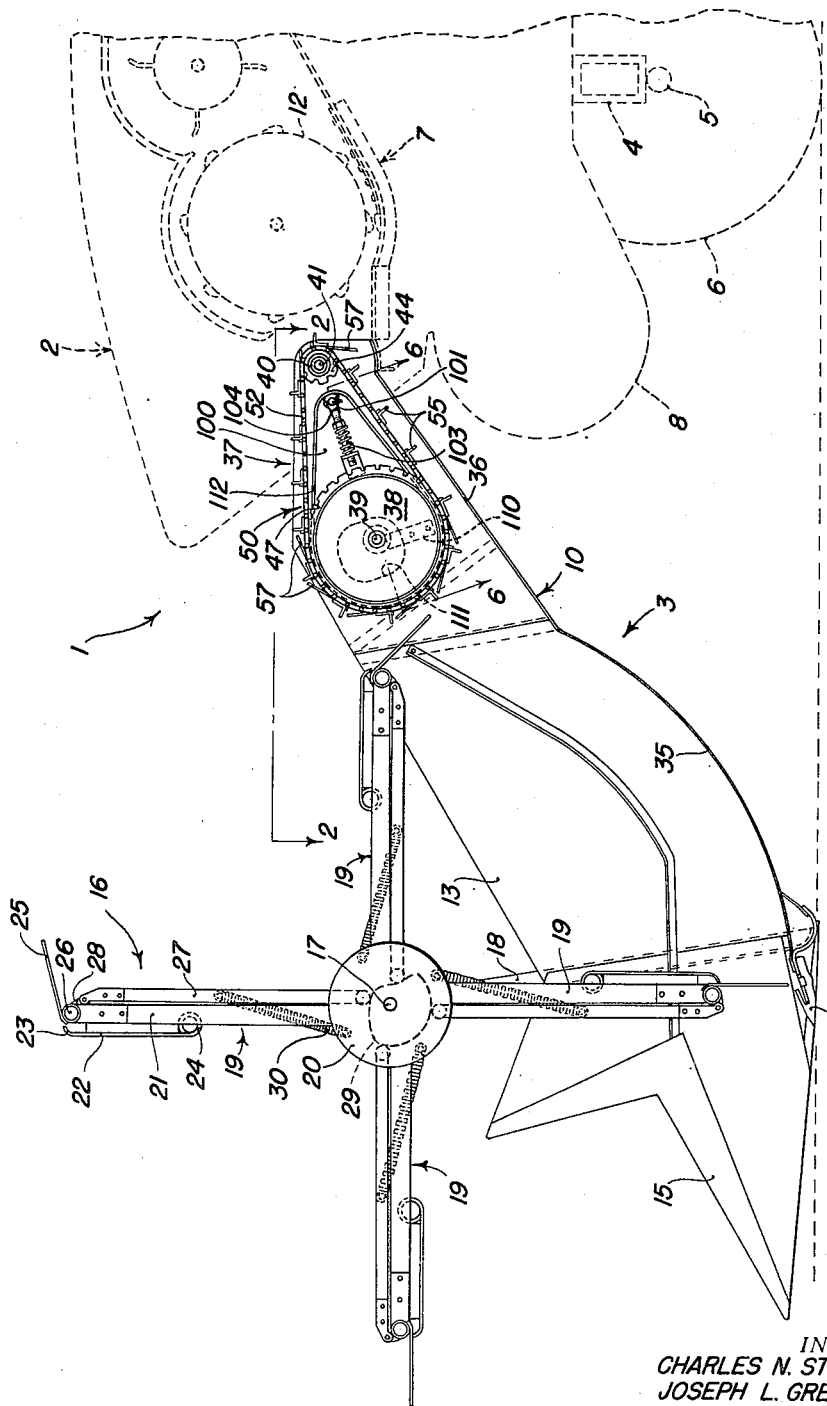

Referring now particularly to Figures 1 and 2, the harvesting machine indicated generally by reference numeral 1 comprises a thresher body 2 indicated in dotted lines and a harvester platform indicated generally by reference numeral 3. The thresher body 2 comprises generally a supporting frame 4 carried on an axle 5 supported on a pair of laterally spaced wheels 6. The thresher body contains the usual threshing mechanism 7 beneath which is a blower housing 8 containing a blower for separating the chaff from the grain.

The platform 3 comprises a grain pan 10 inclined upwardly and rearwardly from a cutter bar 11 to the upper end which terminates just ahead of the threshing cylinder 12. A pair of side sheets 13, 14 extend longitudinally along opposite sides of the grain pan 10, and carry the usual dividers 15 at the forward ends thereof.

A harvester reel 16 is rotatably mounted on a transversely extending shaft 17 carried on a pair of standards 18 at opposite sides of the platform. The reel 16 comprises four radially extending rigid frames 19 fixed to a pair of laterally spaced hub members 20. Each of the frames 19 comprises a pair of laterally spaced arms 21 rigidly interconnected at their outer ends by a board or blade 22, the outer and inner edges 23, 24, respectively, being curved or rounded to discourage straw from hanging thereon. A row of raking teeth 25 are fixed to a shaft 26 which is journaled along the outer edge of each of the frames 19 providing for rocking movement of the teeth 25 relative to the frames 19, for the purpose of obtaining a feathering action of the teeth as they are withdrawn from the harvested material moved thereby. The teeth are rocked by means of a radially extending actuating rod 27 lying alongside of each of the arms 21 at one side of the reel and slidable with respect thereto. The outer end of each rod 27 is pivoted to a bell crank 28 which is fixed to the shaft 26 upon which the teeth are supported. The inner end of each rod 27 is slidably received through a suitable opening in the outer circumference of the hub 20 and slidably bears upon the edge of a camming member 29 which is fixed to the reel supporting axle 17, the latter being held stationary in the standards 18, while the reel rotates. The rods 27 are each urged inwardly in contact with the camming member 29 by means of a spring 30 suitably connected at opposite ends to the rod 27 and the hub 28, respectively. Thus, as the wheel rotates, the inner ends of the rods 27 slide along the camming surface 29 which is shaped in such a manner that the rake fingers 25 are held in a radially extending position as they move downwardly in front of the cutter bar and engage the harvested material to sweep it upwardly and rearwardly in the grain pan 10, but as the rake fingers are withdrawn from the harvested material during the upward movement of the reel arm, the fingers 25 are rocked by the action of the cam and rod 27 to a position in which the fingers are withdrawn lengthwise from the harvested material.

The lower portion of the grain pan 10 is curved as at 35 in a generally circular arc about the axis of rotation of the reel. The concave portion 35 is positioned closely adjacent to the path of movement of the outer ends of the fingers 25 so as to cooperate therewith in sweeping the harvested crops upwardly through the inclined grain pan to an intermediate point therein in which the reel fingers are disengaged from the crop.

The upper portion 36 of the grain pan 10 is disposed in an upwardly and rearwardly inclined plane and the harvested material is swept upwardly along this portion of the grain pan by means of an overhung conveyor 37 which will now be described.

The conveyor 37 comprises a front roller 38 of comparatively large diameter mounted directly in back of the reel and positioned to barely clear the outer ends of the upwardly moving fingers 25.

The roller 38 is mounted on an axle 39, which is journaled in bearings 39' at opposite ends thereof, respectively. Each of the bearings 39' is fixedly supported on a plate 100, best shown in Figure 6, which is disposed against the inner side of each side sheet 13, 14 and shiftable relative thereto. Each plate 100 is pivotally connected to its respective side sheet by a pin 101, the latter having a shoulder bearing against the side sheet and fixed thereto by riveting the outer end of the pin. The plate 100 has a fore and aft extending slot 102 for receiving the pin, thereby providing for a limited amount of fore and aft shifting as well as a vertical swinging movement. The plate 100 is urged forwardly by means of a helical compression spring 103, which embraces an eye bolt 104 having an eye portion 105 encircling the pin 101. The spring 103 acts against a nut 106, threaded on the bolt 104, and reacts against the flange 108 of an angular bracket 107 fixed as by rivets to the plate 100. The flange 108 has an aperture through which the end of the bolt projects. The force of the spring can be regulated by adjusting the nut 106 on the eye bolt.

Spaced upwardly and rearwardly from the roller 38 is a second roller 40 of comparatively small diameter which is journaled on a shaft 41 which is coaxial with the axis of vertical swinging movement of the harvester platform 3 relative to the thresher body 2. The shaft 41 is journaled at opposite ends thereof in a pair of bearings 42 which are supported in the side sheets 2' of the thresher body 2. The rear roller 40 includes three sprockets 43, 44, 45 fixed to the shaft 41 at opposite ends thereof and at the center thereof, respectively. The front roller 38 also includes three sprockets 46, 47, 48 disposed in alignment with the sprockets 43, 44, 45 on the small roller 40, respectively.

A flexible endless member, indicated generally by reference numeral 50, is trained over the two rollers 38 and 40 and comprises three laterally spaced chains 51, 52, 53, trained around each corresponding pair of sprockets, respectively. Interconnecting the center chain 53 with each of the outer chains 51, 52, is a plurality of transversely disposed slats 55 arranged in staggered formation around the circumference of the chains, as best shown in Figure 2. The slats 55 are in the form of angle bars, one side of which is riveted or bolted to the chains and the other side extending outwardly therefrom, and serve as crop engaging projections for moving the harvested material upwardly on the straight portion 36 of the inclined grain pan 10. As indicated in Figure 1, the lower run or lap of the conveyor member 50 is spaced above the grain pan to receive the harvested material between the member 50 and the pan but is close enough thereto so that the projecting sides of the slats 55 cooperate with the grain pan to sweep the material rearwardly therein. The spacing between the conveyor and the grain pan is limited by a stop member 110, which is fixed on the outer side of each side sheet 13, 14 and engages the bearing hub 39' of the roller 38, the side sheets having enlarged openings 111 through which the bearings 39' project and providing for movement of the roller 38 relative to the side sheets 13, 14.

The forward roller 38 is made of comparatively large diameter in order to provide an appreciable portion of the endless conveyor member 50 which has a downward direction of movement behind the ends of the reel fingers 25 and in close proximity thereto for the purpose of stripping from the fingers any of the harvested material which tends to cling thereto. It will be noted that the forward roller 38 includes a cylindrical imperforated shield 56 which prevents any material from being thrown from the fingers 25 into the interior of the endless conveyor member 50 and directs any such material that is thrown from the fingers to the grain pan where it is engaged by the slats 55 and swept rearwardly therein. The pivoted plates 100 have an inwardly turned flange 112 for stiffening the plate and the flange also cooperates with the edge of the drum or shield 56 to serve as a seal to prevent material from entering the drum.

A plurality of laterally spaced fingers 57 is fixed to each of the slats 55. Each finger 57 is fixed rigidly to the slat and lies approximately in the plane of the side of each slat which is fastened to the chains. Thus the fingers merely lie on top of the harvested material as it is being swept upwardly in the grain pan, but as the chains bend around the small diameter sprockets the fingers 57 swing outwardly from the chains and serve to kick the material into the threshing cylinder 12 with a sudden flicking movement. Obviously, the smaller the diameter of the rear roller 40, the more pronounced this flicking movement will become. As the fingers 57 move around the large diameter roller 38, they again project outwardly but to a much lesser extent and aid in stripping material from the reel fingers 25.

In the embodiment of Figure 3, the large roller 38 is replaced by a pair of small rollers 60, 61 of substantially the same size as the rear roller 40. The rollers 60, 61 are spaced one above the other to provide a three-sided path of travel of the endless conveyor member 50. The member 50 moves downwardly in the forward lap of the travel, in close proximity with the ends of the upwardly moving fingers 25 on the reel and thus serve to strip harvested material therefrom.

While the structure of this embodiment has the advantage that its stripping action is effective over a greater arc of movement of the reel, it lacks the protection of the cylindrical shield 56 on the large roller in the embodiment of Figures 1 and 2, and therefore a stationary protecting shield 62 is provided in back of the downwardly moving run of the endless conveyor member 50. The shield 62 comprises a flat sheet metal member having a turned flange 63 at its upper end for stiffening purposes, and is supported at opposite ends thereof by brackets 64 which are bolted to the side plates 13, 14, respectively. Another shield 65 is provided above the lower lap of the endless conveyor member 50, one edge of the shield 65 being curved around a supporting rod 66 which is carried between the side sheets 13, 14, and the other edge of the shield being supported by a bracket 67 at each of the side sheets 13, 14. In this embodiment the conveyor fingers 57 are fastened on the outside of the angle bars 55 and are also bent outwardly slightly to aid the angle bars 55 in engaging the harvested material in the grain pan and also to increase the stripping action of the conveyor 50 upon the fingers 25.

The mechanism for driving the reel in each of these embodiments is not shown in the drawings as it forms no part of the present invention and is well known to those skilled in the art, but can be any suitable means for driving the reel in a counterclockwise direction, as viewed in the drawings, as, for instance, by a chain and sprocket or by a V-belt and pulleys in conventional manner. Power for driving the reel can be obtained from the source of power which drives the threshing cylinder or from one of the ground wheels of the harvesting machine, as desired.

The flexible endless conveyor 50 is preferably driven by suitable power transmitting means attached to an extension 41' outside of the side sheet 2', the power transmitting means being any suitable form of belt, chain or gear drive which drives the chains in a counterclockwise direction as viewed in the drawings.

The embodiment of Figure 4 differs from the preceding embodiments in that the reel 16 discharges the harvested material upon the top of a short canvas platform conveyor 70 instead of to an undershot slatted conveyor of the type described hereinbefore. The conveyor 70 comprises an endless canvas 71 of any suitable conventional design and having transverse wooden slats 72 fixed thereto for engaging the harvested material. The canvas 71 is trained around a pair of fore and aft spaced transversely extending rollers 73, 74, respectively, which are suitably supported on shafts 75, 76 carried in journal bearings in the opposite side sheets 13, 14, respectively. The upper portion 36' of the inclined grain pan 10 is recessed below the rear edge of the concave front portion 35 of the grain pan in order that the harvested crops will be swept from the concave portion 35 directly onto the top of the canvas conveyor 70 by the reel fingers 25.

Although this embodiment makes use of a canvas conveyor of more or less conventional details of construction, it is evident that the usual troubles experienced due to wear and misadjustment of the canvas are greatly diminished by our invention because of the small amount of canvas required as compared with the amount of canvas used in the conventional machine in which the conveyor extends down to the cutter bar 11.

Any harvested material that is thrown rearwardly from the fingers 25 of the reel, is thrown against the lower lap of a short upper canvas 80 which is moving toward the cylinder 12 and acts further to crowd the grain into contact with the cylinder, in cooperation with the lower canvas 71. The upper canvas 80 is also provided with transverse wooden slats 81 and is trained around a pair of fore and aft spaced rollers 82, 83 which are rotatably supported on a pair of shafts 84, 85, respectively, carried in the thresher housing 2.

In the embodiment shown in Figure 5, the upper rear conveying means comprises a second reel 90, which is preferably similar to the main reel 16 but of smaller diameter. Inasmuch as the details of construction of the second reel 90 are similar to those described in connection with the main reel 16, the corresponding parts of the reel 90 will be given similar reference numerals, but with the suffix "a". The fingers 25a of the small reel 90 are staggered with respect to the fingers 25 of the main reel 16 so that the downwardly moving fingers of the small reel 90 can intermesh with the upwardly moving fingers 25 of the main reel 16, thus providing a stripping action for stripping harvested material from the main reel.

In this embodiment the upper portion 91 of the grain pan is curved about the axis of rotation of the second reel 90 to cooperate with the fingers 25a to assist the latter in sweeping the crops along the upper portion of the grain pan and into the cylinder. The two concave portions 35, 91 of the inclined grain pan, are interconnected by means of an intermediate convex section 92. Although the two concave portions may be continued to their line of intersection, it is preferable to interpose the convex section 92 therebetween in order to avoid the possibility of straw or stalks from becoming hung over the sharp corner that would result from the two concave portions being continued to their line of intersection.

The reel fingers 25a are given a feathering action by means of actuating rods 27a cooperating with a stationary cam 29a so that the fingers may be drawn out of the crops lengthwise as the crops are discharged into the cylinder. In this embodiment, as in the other embodiments, the platform 3 is hinged for vertical swinging movement to the thresher body 2 about a transverse axis indicated at 41a. The second reel 90 is driven by any suitable means which is not shown and described herein, as such means are well known to those skilled in the art.

We do not intend our invention to be limited to the specific embodiments and details shown and described herein, but may be varied without departing from the scope of our invention. What we claim as our invention is set forth in the following claims.

We claim:

1. In a combine comprising a fore and aft extending grain pan having an imperforate bottom pivotally supported at its rear end, a cutter bar mounted at the forward end thereof, and a threshing cylinder mounted behind said grain pan for treating harvested material received therefrom, the combination of a reel mounted over said cutter bar and having crop engaging members cooperable with the bottom of said grain pan for sweeping the crop rearwardly thereon, and a conveyor including fore and aft spaced supporting rollers mounted in said pan behind said reel and a flexible endless member trained over said rollers and movable downwardly behind said reel in close proximity thereto for stripping crops therefrom, said endless member being spaced above the bottom of said pan and having projections extending downwardly over said pan to engage crops therein for sliding the latter over the bottom of the pan from said reel to the rear end thereof and delivering the same to said cylinder.

2. In a harvester, a grain pan pivotally supported at its rear end, a reel mounted over the forward end thereof, said pan being concave to conform with the arms of said reel to cooperate therewith for sweeping harvested material rearwardly in the pan, and a conveyor for receiving said material from said reel and moving the same to the rear end of the pan comprising a roller of comparatively large diameter disposed over said pan behind said reel, a second roller of comparatively small diameter disposed near the rear end of said pan, and a flexible endless member trained over said rollers and having projections for stripping material from the reel and sweeping the same rearwardly therefrom in the pan.

3. In a harvester, a grain pan, a crop gathering device having members movable rearwardly in the front portion thereof to move harvested material rearwardly therein, and a conveyor for receiving said material from said device and moving the same to the rear end of the pan comprising a pair of rollers spaced one above the other in the pan behind said gathering device, a third roller disposed behind said pair of rollers, and a flexible endless member trained over said three rollers and movable downwardly behind the gathering device and rearwardly along the pan to sweep said material to the rear end of the pan.

4. In a harvester, a grain pan, a reel mounted over the lower end thereof for sweeping harvested material rearwardly in the pan, and a conveyor for receiving the material from the reel and moving the same to the rear end of the pan comprising a pair of upper and lower rollers mounted in the pan behind said reel, a third roller disposed behind said pair of rollers, and a flexible endless member trained over said three rollers and having projections thereon adapted to strip said material from said reel as the conveyor moves downwardly between said pair of rollers and for sweeping said material rearwardly as said member moves over said pan to said third roller.

5. In a harvester, an imperforate grain pan, a crop gathering device at the forward end of the pan having crop engaging members for moving harvested crops over said pan, and a flexible endless conveyor disposed behind said gathering device and having a lower flight spaced above said pan and movable rearwardly generally parallel thereto and engageable with crops in said pan received from said gathering device for sweeping the same over the bottom of the pan, and an upper flight movable forwardly in diverging relation to said lower flight, providing a downwardly moving conveyor section behind said gathering device for stripping crops from the latter.

6. In a harvester, an imperforate grain pan, a crop gathering device at the forward end of the pan having crop engaging members for moving harvested crops over said pan, and a flexible endless conveyor disposed behind said gathering device for receiving harvested crops from said gathering device and sweeping the same to the rear end of said pan, a rear roller of comparatively small diameter over which the endless conveyor is trained, and front roller means at the forward end of said conveyor and behind said gathering device, for maintaining the upper and lower flights of the conveyor in forwardly diverging relation, providing therebetween a downwardly moving conveyor section behind said gathering device for stripping crops from the latter.

7. In a combine comprising a thresher housing, a forwardly and downwardly extending harvester platform attached thereto, and a threshing cylinder journaled in said housing, the combination of a reel mounted over the forward end of said platform and having crop engaging members cooperable with the surface of said platform for sweeping the harvested crop upwardly and rearwardly thereon, said platform being formed arcuate under said reel, a flexible endless conveyor disposed above said platform behind said reel, a rear roller journaled for rotation at the rear end of said platform over which said flexible conveyor is trained for feeding crops to said cylinder, and front roller means for supporting the conveyor with its lower flight disposed above the surface of said platform and its upper flight extending forwardly from said rear roller in diverging relation to said lower flight, to provide an appreciable portion of said conveyor between said flights disposed generally vertically behind said reel and movable downwardly to strip crops from the latter and rearwardly over said platform to sweep the crops back to said cylinder.

8. The combination set forth in claim 7 with the further provision that said front roller means comprises a single roller of appreciably larger diameter than said rear roller.

9. The combination set forth in claim 7 with the further provision that said front roller means comprises a pair of vertically spaced parallel rollers.

10. The combination set forth in claim 7 with the further provision that said crop engaging members on said reel comprise fingers journaled on the latter for swinging movement relative thereto, and means for controlling said relative movement of said fingers to feather the latter as they are withdrawn from said crops.

11. In a harvester including a grain pan having an imperforate bottom and a pair of side walls, a conveyor roller journaled in said pan, a second conveyor roller spaced therefrom and parallel thereto, a pair of side members on which said second roller is journaled, means pivotally connecting said side members with said side walls, respectively, for vertical swinging movement about an axis disposed between the axes of said rollers, a flexible endless conveyor trained around said rollers, and spring means acting between said grain pan and said side members for urging said rollers apart to tighten said conveyor, said pivotal connecting means having sufficient lost motion to accommodate said tightening action of said spring means.

12. The combination set forth in claim 7 with the further provision of crop engaging fingers fixed on said endless conveyor member and extending substantially parallel to said conveyor in trailing relation to the direction of movement about said rollers.

13. In a combine comprising a thresher housing, a forwardly and downwardly extending harvester platform having a smooth imperforate grain pan and pivotally connected to said housing for vertical swinging movement about a transverse axis, and a threshing cylinder journaled in said housing, the combination of a reel mounted over the forward end of said platform and having crop engaging members cooperable with the surface of said grain pan for sweeping the harvested crops upwardly and rearwardly thereon, and a conveyor for receiving said crops from said reel and feeding the same into said cylinder comprising a rear roller journaled for rotation about the axis of swinging movement of said platform, a front roller spaced above said grain pan ahead of said rear roller, and a flexible endless conveyor member trained over said rollers and disposed with its lower flight spaced above the surface of the grain pan to receive crops therebetween, said conveyor member having crop engaging members for sliding said crops upwardly over the surface of the grain pan.

14. In a combine comprising a thresher housing, a forwardly and downwardly extending harvester platform pivotally connected thereto for vertical swinging movement about a transverse axis, and a threshing cylinder journaled in said housing, the combination of crop gathering means at the forward end of said platform, and a conveyor for receiving said crops from said gathering means and feeding the same into said cylinder comprising a rear roller journaled for rotation about the axis of swinging movement of said platform, a front roller spaced above said platform ahead of said rear roller, and a flexible endless conveyor member trained over said rollers and disposed with its lower flight spaced above the surface of the platform to receive crops therebetween, said conveyor member having crop engaging members for sliding said crops upwardly over the surface of the platform.

15. In a combine comprising a thresher housing, a forwardly and downwardly extending harvester platform pivotally connected thereto for vertical swinging movement about a transverse axis, and a threshing cylinder journaled in said housing, the combination of crop gathering means at the forward end of said platform, and a conveyor for receiving said crops from said gathering means and feeding the same into said cylinder comprising a rear roller of comparatively small diameter journaled for rotation about the axis of swinging movement of said platform, a front roller of comparatively large diameter mounted on said platform ahead of said rear roller and spaced above said platform, and a flexible endless conveyor member trained over said rollers and disposed with its lower flight spaced above the surface of the platform to receive crops therebetween, said conveyor member having crop engaging members for sliding said crops upwardly over the surface of the platform.

16. In a combine comprising a thresher housing, a forwardly and downwardly extending harvester platform pivotally connected thereto for vertical swinging movement about a transverse axis, and a threshing cylinder journaled in said housing, the combination of crop gathering means at the forward end of said platform, and a conveyor for receiving said crops from said gathering means and feeding the same into said cylinder comprising a rear roller journaled for rotation about the axis of swinging movement of said platform, a pair of vertically spaced front rollers mounted on said platform ahead of said rear roller and spaced above said platform, and a flexible endless conveyor member trained over said rollers and disposed with its lower flight spaced above the surface of the platform to receive crops therebetween, said conveyor member having crop engaging members for sliding said crops upwardly over the surface of the platform.

17. In a harvester, a grain pan, a reel mounted over the forward end thereof, and a conveyor for receiving the harvested material from said reel and moving the same rearwardly in the pan comprising a pair of upper and lower rollers journaled over said pan behind said reel, a third roller journaled behind said pair of rollers, a flexible endless member trained over said three rollers and movable thereon downwardly behind said reel and rearwardly over said pan, said member comprising laterally spaced chains engaging said rollers and transverse slats extending between said chains and fixed thereto, and a stationary shield disposed behind the downwardly movable portion of said flexible member and supported on said grain pan.

18. In a harvester, a grain pan, a reel mounted over the forward end thereof, and a conveyor for receiving the harvested material from said reel and moving the same rearwardly in the pan comprising a pair of upper and lower rollers journaled over said pan behind said reel, a third roller journaled behind said pair of rollers, a flexible endless member trained over said three rollers and movable thereon downwardly behind said reel and rearwardly over said pan, said member comprising laterally spaced chains engaging said rollers and transverse slats extending between said chains and fixed thereto, and a stationary shield disposed above the rearwardly movable portion of said flexible member and supported on said grain pan.

19. In a harvester, a grain pan, a reel mounted over the forward end thereof, and a conveyor for receiving the harvested material from said reel and moving the same rearwardly in the pan comprising a pair of upper and lower rollers journaled over said pan behind said reel, a third roller journaled behind said pair of rollers, a flexible endless member trained over said three rollers and movable thereon downwardly behind said reel and rearwardly over said pan, said member comprising laterally spaced chains engaging said rollers and transverse slats extending between said chains and fixed thereto, and stationary shields disposed behind the downwardly movable portion and the rearwardly movable portion of said flexible member, respectively, and supported on said grain pan.

20. For use in a harvester grain pan having a pair of side walls, a conveyor roller journaled in said pan, a second conveyor roller spaced therefrom and parallel thereto, a pair of side members on which said second roller is journaled, means pivotally connecting said side members with said side walls, respectively, for vertical swinging movement about an axis disposed between the axes of said rollers, a flexible endless conveyor trained around said rollers, a pair of bolts swingably mounted on said pivot means, respectively, compression springs disposed coaxially of said bolts, and stops fixed to said side members against which said springs bear, respectively, for urging said rollers apart to tighten said conveyor in all normal positions of said side members.

21. In a combine comprising a fore and aft extending grain pan having an imperforate bottom, a cutter bar mounted at the forward end thereof and a threshing cylinder mounted behind said grain pan for treating harvested material received therefrom, the combination of a reel mounted over said cutter bar and having crop engaging members cooperable with the bottom of said grain pan for sweeping the crop rearwardly to a position intermediate the front and rear ends thereof, and a conveyor including fore and aft spaced supporting rollers mounted in said pan behind said reel and a flexible endless member trained over said rollers and movable downwardly behind said reel in close proximity thereto for stripping crops therefrom, said endless member having a lower flight spaced above said pan and movable rearwardly generally parallel thereto and engageable with crops in said pan received from said reel for sweeping the crops over the rear portion of said pan to be delivered to said cylinder.

22. The combination set forth in claim 21, further characterized in that said grain pan is pivotally supported at its rear end by means providing for vertical swinging movement about a transverse axis and said endless member is mounted on said pan to swing therewith.

23. The combination set forth in claim 21, further characterized in that said grain pan is pivotally supported at its rear end by means providing for vertical swinging movement about a transverse axis, one of said conveyor rollers being mounted in said pan for rotation about said transverse axis and the other of said rollers being journaled in said pan behind said reel.

CHARLES N. STONE.
JOSEPH L. GREEN.
LOUIS A. PARADISE.